Dec. 8, 1931.  L. PAULI  1,835,519
SCALPEL
Filed July 24, 1930
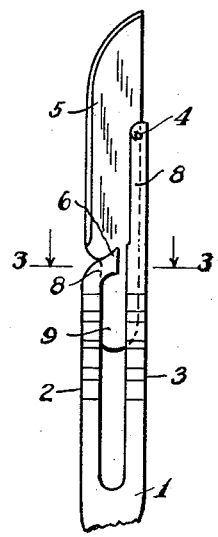
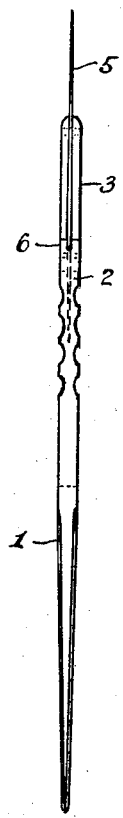
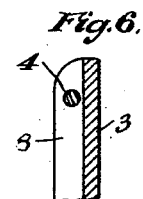
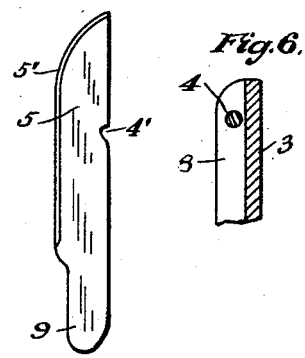
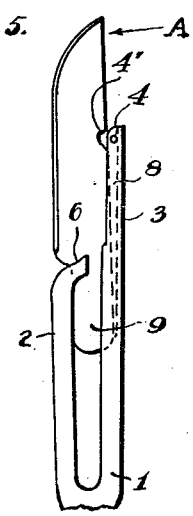
INVENTOR
Leopold Pauli
BY
Harold D. Penney  ATTORNEY Patented Dec. 8, 1931

1,835,519

UNITED STATES PATENT OFFICE

LEOPOLD PAULI, OF WURMLINGEN, GERMANY, ASSIGNOR TO ACTIENGESELLSCHAFT FUR FEINMECHANIK, VORMALS JETTER & SCHEERER, OF TUTTLINGEN, GERMANY, A CORPORATION OF GERMANY

SCALPEL

Application filed July 24, 1930, Serial No. 470,388, and in Germany April 4, 1929.

My present invention relates to an improvement in scalpels for surgeon's use comprising a handle and a separable blade, with means thereon and therebetween whereby the blade and handle may be quickly and appropriately assembled, and as quickly separated for discarding of a blade, resharpening, sterilizing, and the like.

The present device also contemplates an improvement in the tension blade locking and releasing means of the handle of the instrument and the cooperating blade carried handle engaging means.

These and other capabilities will be ascertained as the herein description proceeds, and it is obvious that modifications may be made in the details of the structure disclosed, without departing from the spirit of the invention or the scope of the appended claim.

In the drawings,

Fig. 1 is a side view of my device, with a portion of the handle broken away;

Fig. 2 is a full front view thereof, looking at the cutting edge side of the scalpel;

Fig. 3 is a sectional view taken on the line 3—3;

Fig. 4 is a full side view of the blade;

Fig. 5 is a view similar to Fig. 1 showing the blade in intermediate position of being introduced or removed from the spring handle; and Fig. 6 is an enlarged fragmentary view of the locking spring end of the handle, partly in section, to better show the blade notch lock pin or key.

The handle portion, made of any desired spring metal, is provided with a solid lower tang end 1, and is constructed at its upper end with a yieldable blade engaging means comprising a pair of opposed yieldable parallel arms 2 and 3, Figs. 1 and 5. These arms are integral with the handle tang 1, and are spaced from each other so as to permit individual freedom in functioning to hold or release a cutting blade 5.

To this latter end, the shorter arm 2 is provided at its upper end with an instanding blade engaging lug 6, which is split or grooved as at 7, to blade width, so that the said lug snugly engages an insertible cutter blade on both sides of the blade tang 9, Figs. 1 and 5, and thus act as an opposing blade seat forming means to cooperate with the longer kerfed, resilient opposing blade holding arm 3. The last mentioned arm is provided with a kerf 8 which extends along a little more than half of the length of said arm.

The longer arm 3 is provided, at its outer end, within the kerf 8 with a transverse knife-notch engaging stop-pin 4, which may be riveted across the kerf 8 and into the side portions of the arm 3, as in Figs. 5 and 6.

From the foregoing description it is clear that the handle has a pair of integral resilient cutting blade engaging arms which in normal operative position normally grip and hold a cutting blade in operative cutting position, and that the shorter arm 2 with its split lug 6 coact with the kerfed longer arm 3 with its pin 4 to prevent longitudinal or twisting movement of the blade therein, and thus provide a firm blade clasping means, which is not effected by the normal cutting forces excited by the blade when in use.

To coact with the yieldable handle and blade locking means, the blade, Fig. 4, is provided, at the rear of its cutting edge 5' with a lock-pin registering notch 4'; and below the cutting edge 5' with a reduced blunt edged tang portion 9, the transverse width of which is dimensioned to fit firmly between the slotted blade engaging means on the arms 2 and 3 without any side or end movement. The rear edge of the blade is blunt or manipulable throughout its length.

To remove or replace a blade, as shown in Fig. 5, if the blade is positioned as therein shown, by a slight pressure at the back of the blade as in the direction of and at the point indicated by the arrow A, the blade springs the opposed yieldable arms 2 and 3 apart and is readily seated in operative position, or removed therefrom. The natural repositioning movement of the arms 2 and 3 when a blade is thus introduced thereon, causes said arms to operatively and firmly engage and pin-lock the blade, as shown in Fig. 1.

What I claim is:

In combination, a handle of resilient material bifurcated at its forward end and shaped to provide a long straight arm at one edge and a short arm at its other edge, said short arm having its terminal extremity bent towards the long arm and bifurcated to provide a slot extending lengthwise of the handle and confronting the long arm, said long arm being grooved on the face adjacent the short arm, a pin straddling the groove adjacent the extremity of the long arm, a knife blade having a straight back edge fitting said groove and provided with a notch receiving said pin, a tang on said blade offset from the front cutting edge of the blade toward the back to provide a shoulder between the blade and its tang, said tang fitting the bifurcation of the short arm and extending along the short arm, said shoulder abutting the bent terminal extremity of the short arm.

Signed at Stuttgart, Germany, this 11th day of July A. D. 1930.

LEOPOLD PAULI.